United States Patent
Shimizu

(10) Patent No.: US 11,560,093 B2
(45) Date of Patent: Jan. 24, 2023

(54) VEHICULAR MIRROR SYSTEM AND VEHICULAR MIRROR CONTROL METHOD

(71) Applicant: Toyota Jidosha Kabushiki Kaisha, Toyota (JP)

(72) Inventor: Tatsuya Shimizu, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 75 days.

(21) Appl. No.: 17/319,576

(22) Filed: May 13, 2021

(65) Prior Publication Data
US 2022/0055539 A1 Feb. 24, 2022

(51) Int. Cl.
*B60R 1/08* (2006.01)

(52) U.S. Cl.
CPC .................. *B60R 1/083* (2013.01)

(58) Field of Classification Search
CPC .......... B60R 1/083; B60R 1/086; B60R 1/087
USPC ................. 359/603, 604, 843, 877
See application file for complete search history.

(56) References Cited

U.S. PATENT DOCUMENTS

| | | | | |
|---|---|---|---|---|
| 4,443,057 A | * | 4/1984 | Bauer | B60R 1/087 359/877 |
| 4,580,875 A | * | 4/1986 | Bechtel | B60R 1/087 359/604 |
| 4,917,477 A | * | 4/1990 | Bechtel | G02F 1/153 359/603 |
| 5,715,093 A | * | 2/1998 | Schierbeek | B60Q 1/1423 359/603 |
| 5,812,321 A | * | 9/1998 | Schierbeek | B60Q 1/1423 359/603 |
| 2004/0099786 A1 | * | 5/2004 | Su | G01J 1/26 250/201.1 |

FOREIGN PATENT DOCUMENTS

JP 2002-283914 A 10/2002

* cited by examiner

*Primary Examiner* — Ricky D Shafer
(74) *Attorney, Agent, or Firm* — Dinsmore & Shohl LLP

(57) ABSTRACT

A vehicular mirror system includes: a driving mode acquiring unit configured to acquire one of a first driving mode in which a vehicle travels using an occupant's driving operation and a second driving mode in which the vehicle travels regardless of the occupant's driving operation as a driving mode; and a mirror control unit configured to change a reflectance of a vehicular mirror facing rearward according to a light intensity difference between a light intensity on a side in front of the vehicle and a light intensity on a side to the rear of the vehicle with respect to the vehicular mirror when the driving mode is the first driving mode and to keep the reflectance of the vehicular mirror in a state in which the reflectance is lower than that in a normal state when the driving mode is the second driving mode.

8 Claims, 5 Drawing Sheets

VEHICULAR MIRROR SYSTEM AND VEHICULAR MIRROR CONTROL METHOD

CROSS-REFERENCE TO RELATED APPLICATION

This application claims priority to Japanese Patent Application No. 2020-140432 filed on Aug. 21, 2020, incorporated herein by reference in its entirety.

BACKGROUND

1. Technical Field

The disclosure relates to a vehicular mirror system and a vehicular mirror control method.

2. Description of Related Art

Japanese Unexamined Patent Application Publication No. 2002-283914 (JP 2002-283914 A) discloses an antiglare mirror system in which electrochromic cells are incorporated in a rear-view mirror. The antiglare mirror system described in JP 2002-283914 A has a configuration in which a reflectance of a mirror is changed by applying a voltage corresponding to a light intensity difference between a side in front and a side to the rear of a vehicle to the electrochromic cells.

SUMMARY

In a vehicle having a driving support function or the like, an automated driving vehicle, and the like, since the vehicle travels regardless of an occupant's driving operations, the occupant does not need to see the side to the rear of the vehicle. When the configuration described in JP 2002-283914 A is applied to such a vehicle, an occupant experiences glare until the reflectance of the mirror has been changed, and thus there is room for improvement therein.

The disclosure provides a vehicular mirror system and a vehicular mirror control method that can prevent an occupant who does not perform a driving operation from experiencing glare.

According to a first aspect of the disclosure, there is provided a vehicular mirror system including: a driving mode acquiring unit configured to acquire one of a first driving mode in which a vehicle travels using an occupant's driving operations and a second driving mode in which the vehicle travels regardless of the occupant's driving operations as a driving mode; and a mirror control unit configured to set an automatic antiglare state in which a reflectance of a vehicular mirror facing rearward changes according to a light intensity difference between a light intensity on a side in front of the vehicle and a light intensity on a side to the rear of the vehicle with respect to the vehicular mirror when the driving mode acquired by the driving mode acquiring unit is the first driving mode and to set an antiglare keeping state in which the reflectance of the vehicular mirror is kept in a state in which the reflectance is lower than that in a normal state in which the light intensity difference is in a predetermined range when the driving mode acquired by the driving mode acquiring unit is the second driving mode.

In the vehicular mirror system according to the first aspect, the driving mode acquiring unit acquires the driving mode of the vehicle. Here, the driving mode acquiring unit acquires one of the first driving mode in which the vehicle travels using the occupant's driving operation and the second driving mode in which the vehicle travels regardless of the occupant's driving operation as the driving mode.

The mirror control unit changes the reflectance of the vehicular mirror facing rearward. Here, when the driving mode is the first driving mode, the mirror control unit sets the automatic antiglare state in which the reflectance of the vehicular mirror changes according to the light intensity difference between the light intensity on the side in front of the vehicle and the light intensity on the side to the rear of the vehicle with reference to the vehicular mirror. Accordingly, when an occupant is performing a driving operation, it is possible to prevent the occupant from experiencing glare even when the vehicular mirror is irradiated with light from headlights of a following vehicle or the like.

On the other hand, when the driving mode is the second driving mode, the mirror control unit sets the antiglare keeping state in which the reflectance of the vehicular mirror is kept in a state in which the reflectance is lower than that in a normal state in which the light intensity difference is in a predetermined range. Accordingly, the vehicular mirror can be set to an antiglare state regardless of the light intensity on the side to the rear of the vehicle. Since the reflectance of the vehicular mirror is not changed, the occupant does not feel discomforted. The "second driving mode in which the vehicle travels regardless of the occupant's driving operation" is not limited to an automated driving mode in which the vehicle travels without causing the occupant to perform all operations including steering and acceleration/deceleration. That is, the second driving mode includes a driving mode in which the occupant performs a predetermined operation to keep an operating state of a driving support function of the vehicle without seeing the side to the rear of the vehicle. For example, the second driving mode includes a driving mode in which the occupant grasps a steering wheel to keep the operating state of the driving support function. For example, the second driving mode includes a driving mode in which the occupant depresses an accelerator pedal to keep the operating state of the driving support function.

A second aspect of the disclosure provides the vehicular mirror system according to the first aspect, wherein the mirror control unit is configured to continuously change the reflectance of the vehicular mirror between a normal reflectance in which a degree of antiglare is low and a minimum reflectance in which the degree of antiglare is high in the automatic antiglare state, and the mirror control unit is configured to keep the reflectance of the vehicular mirror at the minimum reflectance in the antiglare keeping state.

In the vehicular mirror system according to the second aspect, since the reflectance of the vehicular mirror is continuously changed between the normal reflectance and the minimum reflectance in the automatic antiglare state, the reflectance of the vehicular mirror is not extremely decreased. Accordingly, in comparison with a configuration in which the reflectance of the vehicular mirror is changed in two steps, or the like, it is possible to achieve both rear-view performance and antiglare performance. In the antiglare keeping state in which the occupant does not need to see the side to the rear, the occupant is not conscious of a following vehicle by keeping the reflectance of the vehicular mirror at the minimum reflectance.

A third aspect of the disclosure provides the vehicular mirror system according to the first or second aspect, wherein the mirror control unit switches the antiglare keeping state to the automatic antiglare state at a time which a predetermined time prior to a time at which the driving mode is switched from the second driving mode to the first driving mode.

In the vehicular mirror system according to the third aspect, by switching the antiglare keeping state to the automatic antiglare state at the time which a predetermined time prior to the time at which the driving mode is switched to the first driving mode in which the occupant performs the driving operation, a rearward situation can be visually recognized before a driving operation is performed.

A fourth aspect of the disclosure provides the vehicular mirror system according to the first or second aspect, wherein the mirror control unit switches the antiglare keeping state to the automatic antiglare state at a place which is a predetermined distance before a place at which the driving mode is switched from the second driving mode to the first driving mode.

In the vehicular mirror system according to the fourth aspect, by switching the antiglare keeping state to the automatic antiglare state at the place which is a predetermined distance before the place at which the driving mode is switched to the first driving mode in which the occupant performs the driving operation, a rearward situation can be visually recognized before the driving operation is performed.

A fifth aspect of the disclosure provides the vehicular mirror system according to any one of the first to fourth aspects, further including a temporary release unit configured to temporarily switch the antiglare keeping state to the automatic antiglare state according to the occupant's operation.

In the vehicular mirror system according to the fifth aspect, even when the vehicular mirror is in the antiglare keeping state, a rearward situation including rear seats can be ascertained by causing the temporary release unit to temporarily switch the vehicular mirror to the automatic antiglare state.

A sixth aspect of the disclosure provides the vehicular mirror system according to any one of the first to fifth aspects, wherein the mirror control unit is configured to change a reflectance of a vehicular mirror including an inner mirror which is provided on a ceiling of a cabin front part as a vehicular mirror.

In the vehicular mirror system according to the sixth aspect, when the driving mode is the first driving mode, the mirror control unit sets the automatic antiglare state in which the reflectance of the inner mirror is changed according to the light intensity difference between the side in front of the vehicle and the side to the rear of the vehicle. On the other hand, when the driving mode is the second driving mode, the mirror control unit can prevent the occupant from experiencing glare, for example, due to reflection of light from headlights of a following vehicle from the inner mirror by setting the inner mirror to the antiglare keeping state.

A seventh aspect of the disclosure provides the vehicular mirror system according to any one of the first to sixth aspects, wherein the mirror control unit is configured to change a reflectance of a vehicular mirror including a pair of outer mirrors which are provided at both ends in a vehicle width direction as vehicular mirrors.

In the vehicular mirror system according to the seventh aspect, when the driving mode is the first driving mode, the mirror control unit sets the automatic antiglare state in which the reflectance of the outer mirrors is changed according to the light intensity difference between the side in front of the vehicle and the side to the rear of the vehicle. On the other hand, when the driving mode is the second driving mode, the mirror control unit can prevent the occupant from experiencing glare, for example, due to reflection of light from headlights of a following vehicle from the outer mirrors by setting the outer mirrors to the antiglare keeping state.

According to an eighth aspect of the disclosure, there is provided a vehicular mirror control method including: acquiring one of a first driving mode in which a vehicle travels using an occupant's driving operation and a second driving mode in which the vehicle travels regardless of the occupant's driving operation as a driving mode; setting an automatic antiglare state in which a reflectance of a vehicular mirror facing rearward changes according to a light intensity difference between a side in front of the vehicle and a side to the rear of the vehicle when the acquired driving mode is the first driving mode; and setting an antiglare keeping state in which the reflectance of the vehicular mirror is kept in a state in which the reflectance is lower than that in a normal state when the acquired driving mode is the second driving mode.

In the vehicular mirror control method according to the eighth aspect, the vehicular mirror is set to the automatic antiglare state in the first driving mode in which the occupant performs a driving operation. Accordingly, even when the vehicular mirror is irradiated with light from headlights of a following vehicle or the like, it is possible to prevent the occupant from experiencing glare. In the second driving mode in which the occupant does not perform the driving operation, the vehicular mirror is set to the antiglare keeping state and thus it is possible to set the vehicular mirror to an antiglare state regardless of the light intensity on the side to the rear of the vehicle.

As described above, with the vehicular mirror system and the vehicular mirror control method according to the disclosure, it is possible to prevent an occupant who does not perform a driving operation from experiencing glare.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicular mirror system 10 according to an embodiment will be described below with reference to the accompanying drawings. Hardware configuration of vehicular mirror system 10

Figure 1:
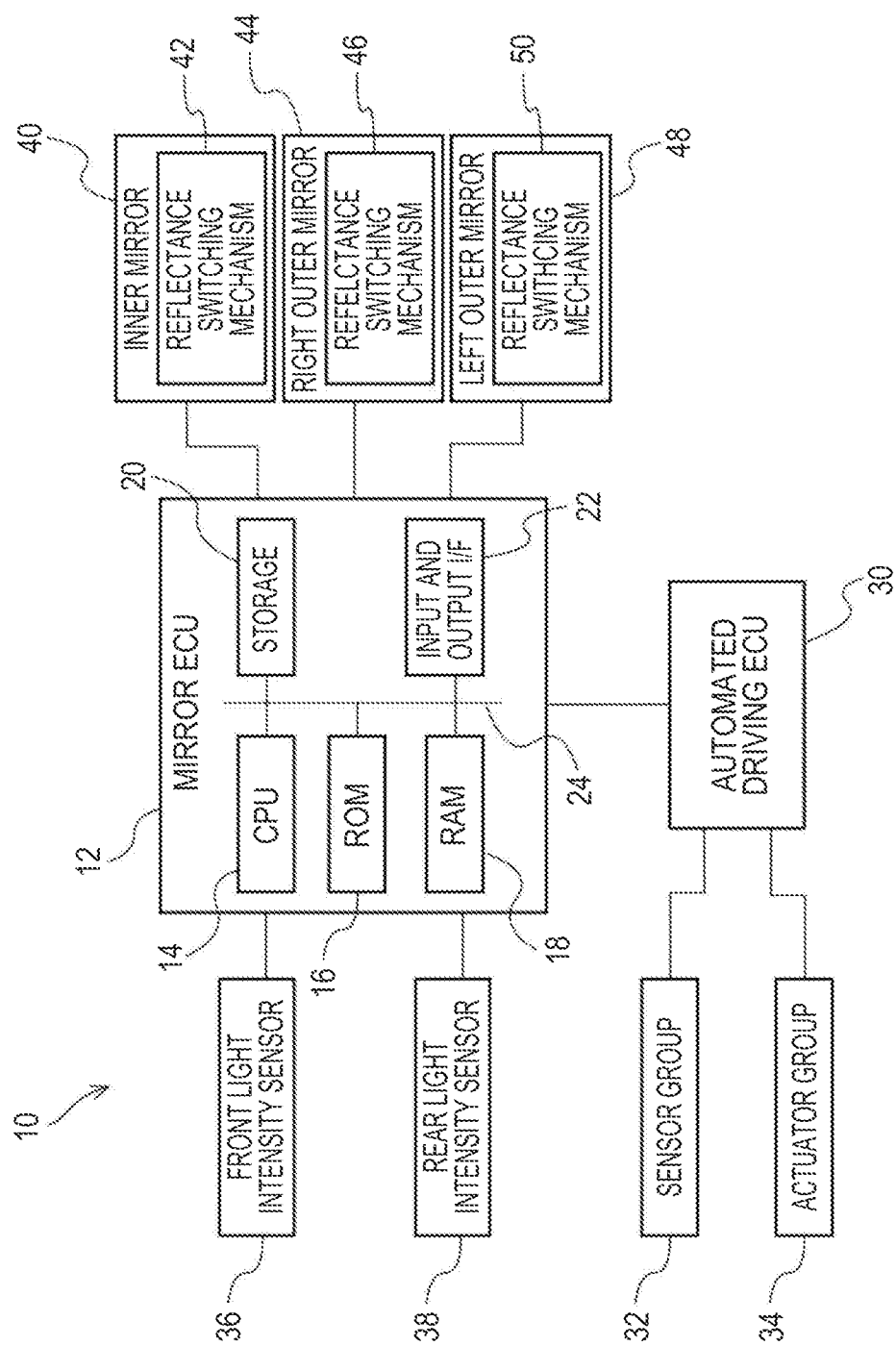
FIG. 1 is a block diagram illustrating a hardware configuration of a vehicular mirror system according to an embodiment.

As illustrated in FIG. 1, the vehicular mirror system 10 according to this embodiment includes a mirror electronic control unit (ECU) 12.

The mirror ECU 12 includes a central processing unit (CPU: processor) 14, a read only memory (ROM) 16, a random access memory (RAM) 18, a storage 20, and an input and output interface 22. These constituents are communicatively connected to each other via an internal bus 24.

The CPU 14 is a central processing unit and executes various programs or controls the constituents. That is, the CPU 14 reads a program from the ROM 16 or the storage 20 and executes the program using the RAM 18 as a work area. The CPU 14 performs control of the constituents and various operation processes in accordance with programs stored in the ROM 16 or the storage 20.

The ROM 16 stores various programs and various types of data. The RAM 18 serves as a work area and temporarily stores programs or data. The storage 20 is constituted by a hard disk drive (HDD) or a solid state drive (SSD) and is a non-transitory recording medium that stores various programs including an operating system and various types of data. In this embodiment, a mirror control program for performing a mirror control process or the like is stored in the ROM 16 or the storage 20. Various types of input and output devices are connected to the input and output interface 22.

The mirror ECU 12 is electrically connected to an automated driving ECU 30. The automated driving ECU 30 includes a CPU, a ROM, a RAM, a storage, and an input and output interface which are not illustrated similarly to the mirror ECU 12.

A sensor group 32 that detects a current state of the vehicle and an actuator group 34 that controls travel of the vehicle are connected to the automated driving ECU 30. The sensor group 32 includes a plurality of sensors out of various types of sensors such as a camera, a radar, a Light Detection and Ranging or Laser Imaging Detection and Ranging (LIDAR) sensor, a global positioning system (GPS) sensor. The camera images surroundings of the vehicle. The radar detects a distance and a direction to an object near the vehicle using radio waves. The LIDAR detects a distance and a direction to an object near the vehicle using laser beams. The GPS sensor detects a current location of the vehicle. In addition, the sensor group 32 includes a sensor that detects a state of an occupant. For example, the sensor group 32 may include a biometric sensor that detects a heart rate and a degree of arousal of an occupant.

The actuator group 34 includes an acceleration/deceleration actuator that adjusts acceleration/deceleration of the vehicle and a steering actuator that drives a steering device of the vehicle. The automated driving ECU 30 performs automated driving of the vehicle by controlling the operation of the actuator group 34 based on a current situation of the vehicle detected by the sensor group 32. A scheduled route indicating a route in which the vehicle is scheduled to travel is stored in a storage unit of the automated driving ECU 30, and the automated driving ECU 30 causes the vehicle to travel along the scheduled route stored in the storage unit.

An inner mirror 40, a right outer mirror 44, and a left outer mirror 48 are connected as vehicular mirrors to the mirror ECU 12. A front light intensity sensor 36 and the rear light intensity sensor 38 are connected to the mirror ECU 12.

Figure 2:
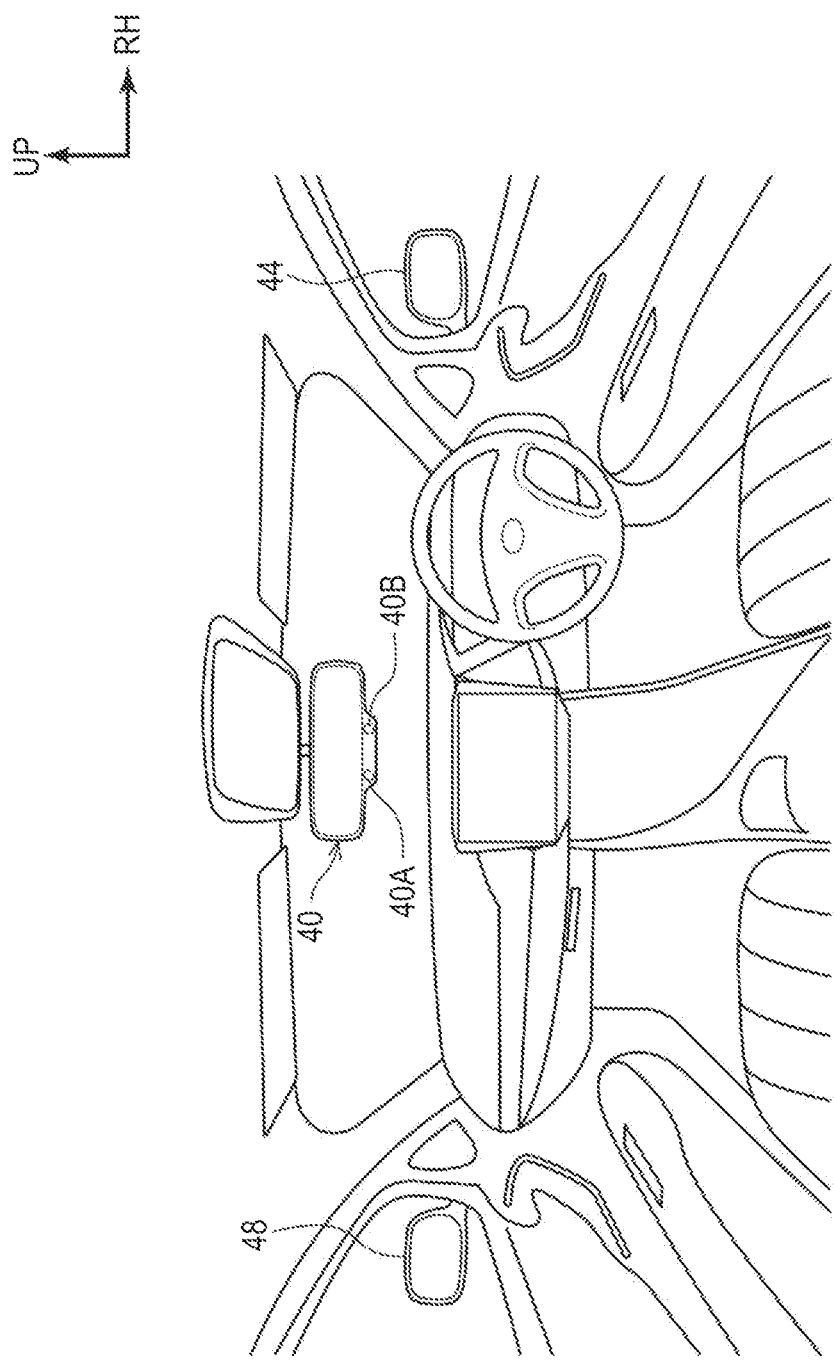
FIG. 2 is a diagram schematically illustrating a state of a cabin front part of a vehicle according to the embodiment when seen from a side to the rear of the vehicle.

As illustrated in FIG. 2, the inner mirror 40 is provided in a ceiling of a cabin front part and faces rearward. For example, the inner mirror 40 in this embodiment includes a first indicator 40A and a second indicator 40B in the lower part thereof. The first indicator 40A is configured to be turned on when the inner mirror 40 is in an automatic antiglare state. The second indicator 40B is configured to be turned on when the inner mirror 40 is in an antiglare keeping state. The automatic antiglare state and the antiglare keeping state will be described later.

The right outer mirror 44 is provided on the right side of the vehicle and faces rearward. On the other hand, the left outer mirror 48 is provided on the left side of the vehicle and faces rearward.

As illustrated in FIG. 1, a reflectance switching mechanism 42 is provided in the inner mirror 40. A reflectance switching mechanism 46 is provided in the right outer mirror 44. A reflectance switching mechanism 50 is provided in the left outer mirror 48.

The reflectance switching mechanism 42, the reflectance switching mechanism 46, and the reflectance switching mechanism 50 have the same structure, for example, a structure in which a reflectance of a mirror is changed in a stepless manner by applying a voltage to an electrochromic material provided between a glass surface and a reflecting surface. In this structure, a degree of antiglare can be changed by changing the voltage applied to the electrochromic material according to a light intensity difference between a light intensity on the side in front of the vehicle and a light intensity on the side to the rear of the vehicle. Another structure may be employed to switch the reflectance of a mirror and, for example, a configuration for switching between a case in which light is reflected by a front surface of the mirror and a case in which light is reflected by a rear surface of the mirror using rear-surface reflection of the mirror may be employed.

The front light intensity sensor 36 is provided, for example, on a surface of the inner mirror 40 facing the side in front of the vehicle and detects a light intensity on the side in front of the vehicle. The rear light intensity sensor 38 is provided, for example, on a surface of the inner mirror 40 facing the side to the rear of the vehicle and detects a light intensity on the side to the rear of the vehicle.

In this embodiment, for example, the reflectances of the inner mirror 40, the right outer mirror 44, and the left outer mirror 48 are switched based on the results of detection from the front light intensity sensor 36 and the rear light intensity sensor 38, but the disclosure is not limited thereto. For example, a front light intensity sensor and a rear light intensity sensor may be provided in each of the inner mirror 40, the right outer mirror 44, and the left outer mirror 48.

Functional Configuration of Vehicular Mirror System 10

The vehicular mirror system 10 realizes various functions using the aforementioned hardware resources. Functional constituents which are realized by the vehicular mirror system 10 will be described below with reference to FIG. 3.

Figure 3:
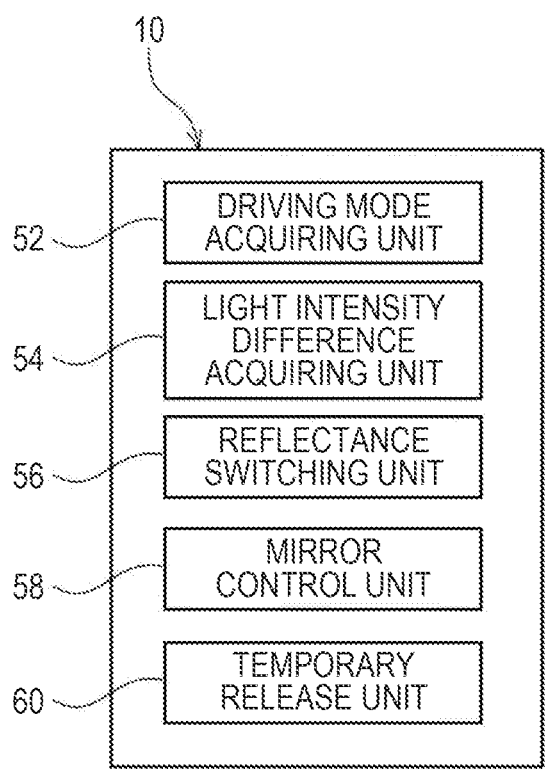
FIG. 3 is a block diagram illustrating a functional configuration of the vehicular mirror system according to the embodiment.

As illustrated in FIG. 3, the vehicular mirror system 10 includes a driving mode acquiring unit 52, a light intensity difference acquiring unit 54, a reflectance switching unit 56, a mirror control unit 58, and a temporary release unit 60 as functional constituents. The functional constituents are realized by causing the CPU 14 of the mirror ECU 12 to read and execute a program.

The driving mode acquiring unit 52 acquires one of a first driving mode and a second driving mode as a driving mode of the vehicle. Here, the first driving mode in this embodiment represents a driving mode in which the vehicle travels according to an occupant's driving operation. The second driving mode in this embodiment represents a driving mode in which the vehicle travels regardless of the occupant's driving operation.

The light intensity difference acquiring unit 54 acquires a light intensity difference between the side in front and the side to the rear of the vehicle. Specifically, the light intensity difference acquiring unit 54 acquires a light intensity difference which is calculated based on the results of detection from the front light intensity sensor 36 and the rear light intensity sensor 38.

The reflectance switching unit 56 switches the reflectances of the inner mirror 40, the right outer mirror 44, and the left outer mirror 48. Specifically, the reflectance switching unit 56 decreases the reflectances of the inner mirror 40, the right outer mirror 44, and the left outer mirror 48 as the light intensity difference acquired by the light intensity difference acquiring unit 54 increases. That is, the reflectance switching unit 56 increases the degrees of antiglare as the light intensity difference acquired by the light intensity difference acquiring unit 54 increases. In this way, the state in which the reflectances of the inner mirror 40, the right outer mirror 44, and the left outer mirror 48 are switched according to the light intensity difference is referred to as an automatic antiglare state.

On the other hand, the reflectance switching unit 56 may keep the reflectances of the inner mirror 40, the right outer mirror 44, and the left outer mirror 48 lower than that in a normal state in which the light intensity difference is in a predetermined range regardless of the light intensity difference. This state is referred to as an antiglare keeping state. In this embodiment, for example, in the automatic antiglare state, the reflectances of the inner mirror 40, the right outer mirror 44, and the left outer mirror 48 are continuously changed between a normal reflectance at which the degree of antiglare is low and a minimum reflectance at which the degree of antiglare is high. In the antiglare keeping state, the reflectances of the inner mirror 40, the right outer mirror 44, and the left outer mirror 48 are kept at the minimum reflectance. The minimum reflectance mentioned herein means a lowest reflectance as long as an occupant can see the side to the rear, and the functions of the inner mirror 40, the right outer mirror 44, and the left outer mirror 48 work even at the minimum reflectance.

The mirror control unit 58 sets the automatic antiglare state when the driving mode acquired by the driving mode acquiring unit 52 is the first driving mode, and sets the antiglare keeping state when the driving mode acquired by the driving mode acquiring unit 52 is the second driving mode.

In this embodiment, for example, the mirror control unit 58 switches the antiglare keeping state to the automatic antiglare state at a time which is a predetermined time prior to a time at which the driving mode is switched from the second driving mode to the first driving mode. For example, when automated driving is ended based on a scheduled route stored in the storage unit of the automated driving ECU 30, the mirror control unit 58 switches the antiglare keeping state to the automatic antiglare state at a time which is a predetermined time prior to a scheduled time at which the automated driving is to be ended.

The disclosure is not limited thereto and may employ a configuration in which the mirror control unit 58 switches the antiglare keeping state to the automatic antiglare state in a predetermined distance from a place at which the driving mode is switched from the second driving mode to the first driving mode. Accordingly, an occupant can visually recognize a situation on the side to the rear before the occupant performs a driving operation.

Figure 4:
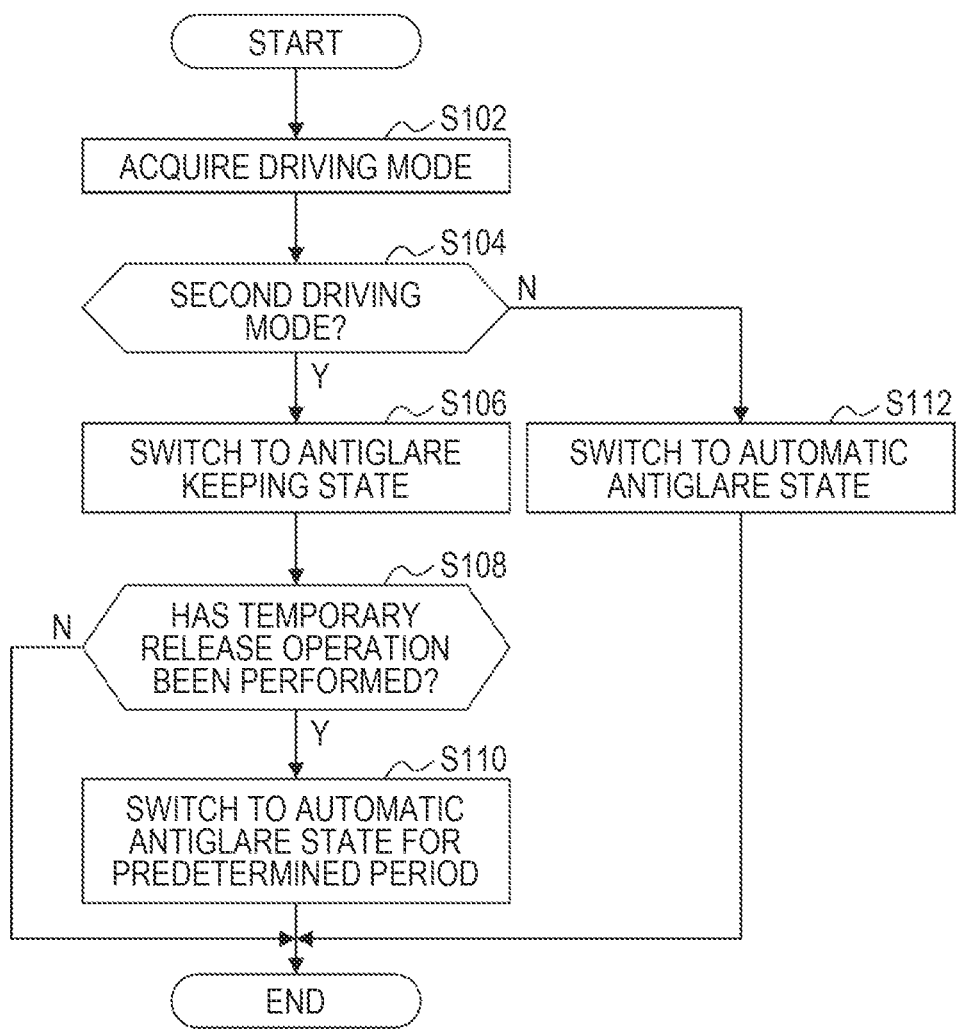
FIG. 4 is a flowchart illustrating an example of a flow of a mirror control process according to the embodiment.

The temporary release unit 60 temporarily switches the inner mirror 40 to the automatic antiglare state according to an occupant's operation when the vehicle is traveling in the antiglare keeping state. Specifically, a switch which is not illustrated is provided in the vicinity of the steering wheel or the vicinity of an instrument panel, and a signal for releasing the antiglare keeping state is transmitted to the mirror ECU 12 by allowing an occupant to operate the switch. Then, the temporary release unit 60 temporarily switches the inner mirror 40 from the antiglare keeping state to the automatic antiglare state via the mirror control unit 58. In this embodiment, for example, when a predetermined time elapses after the inner mirror 40 has been switched to the automatic antiglare state, the inner mirror 40 is returned to the antiglare keeping state. Operations Operations in this embodiment will be described below.
Example of Mirror Control Process FIG. 4 is a flowchart illustrating an example of a flow of a mirror control process which is performed by the vehicular mirror system 10. The mirror control process is performed by causing the CPU 14 of the mirror ECU 12 to read a program from the ROM 16 or the storage 20, to load the read program to the RAM 18, and to execute the loaded program. The mirror control process in this embodiment is performed at predetermined intervals until driving of the vehicle is ended after it has been started.

As illustrated in FIG. 4, the CPU 14 acquires a driving mode of a vehicle in Step S102. Specifically, the CPU 14 acquires the driving mode of the vehicle using the function of the driving mode acquiring unit 52.

Then, in Step S104, the CPU 14 determines whether the driving mode is the second driving mode. When the vehicle is traveling using the automated driving ECU 30 regardless of an occupant's driving operation, the determination result of Step S104 is positive and the CPU 14 performs the process of Step S106. On the other hand, when the vehicle does not travel using the automated driving ECU 30, the determination result of Step S104 is negative and the CPU 14 performs the process of Step S112.

The CPU 14 switches to the antiglare keeping state in Step S106. Specifically, the CPU 14 keeps the reflectances of the inner mirror 40, the right outer mirror 44, and the left outer mirror 48 at the minimum reflectance using the function of the mirror control unit 58. At this time, since the second indicator 40B of the inner mirror 40 illustrated in FIG. 2 is turned on, the occupant can visually recognize the antiglare keeping state. When the antiglare keeping state is set already, the antiglare keeping state is maintained.

As illustrated in FIG. 4, when the determination result of Step S104 is negative, the CPU 14 switches to the automatic antiglare state in Step S112. Specifically, the CPU 14 switches the reflectances of the inner mirror 40, the right outer mirror 44, and the left outer mirror 48 according to the light intensity difference using the function of the mirror control unit 58. At this time, since the first indicator 40A of the inner mirror 40 illustrated in FIG. 2 is turned on, the occupant can visually recognize the automatic antiglare state. When the automatic antiglare state is set already, the automatic antiglare state is maintained.

As illustrated in FIG. 4, the CPU 14 determines whether a temporary release operation has been performed in Step S108. Specifically, when an operation of temporarily releasing the antiglare keeping state has been performed in response to the occupant's driving operation, the determination result of Step S108 is positive and the CPU 14 performs the process of Step S110. On the other hand, when a temporary release operation has not been performed, the CPU 14 ends the mirror control process.

The CPU 14 switches to the automatic antiglare state for a predetermined time in Step S110. Specifically, the CPU 14 temporarily switches the inner mirror 40 from the antiglare keeping state to the automatic antiglare state using the function of the temporary release unit 60. After a predetermined time elapses, the CPU 14 returns the inner mirror 40 from the automatic antiglare state to the antiglare keeping state. Then, the CPU 14 ends the mirror control process.

As described above, in the vehicular mirror system 10 according to this embodiment, when the driving mode is the first driving mode, the mirror control unit 58 sets the inner mirror 40, the right outer mirror 44, and the left outer mirror 48 to the automatic antiglare state. Accordingly, when the occupant is performing a driving operation and is irradiated with light from headlights of a following vehicle or the like, it is possible to prevent the occupant from experiencing glare.

On the other hand, when the driving mode is the second driving mode, the mirror control unit sets the inner mirror 40, the right outer mirror 44, and the left outer mirror 48 to the antiglare keeping state. Accordingly, the inner mirror 40, the right outer mirror 44, and the left outer mirror 48 can be set to an antiglare state regardless of a light intensity on the side to the rear of the vehicle. Since the reflectances of the inner mirror 40, the right outer mirror 44, and the left outer mirror 48 does not change, the occupant is not caused to feel discomforted. In this way, it is possible to prevent an occupant who does not perform a driving operation from experiencing glare.

In this embodiment, in the automatic antiglare state, the reflectances of the inner mirror 40, the right outer mirror 44, and the left outer mirror 48 are continuously changed between the normal reflectance and the minimum reflectance. Accordingly, in comparison with a case in which the reflectances of the inner mirror 40, the right outer mirror 44, and the left outer mirror 48 are changed in two steps or the like, it is possible to achieve both rear-view performance and antiglare performance. On the other hand, in the antiglare keeping state in which an occupant does not need to see the side to the rear, the occupant is not conscious of a following vehicle by keeping the reflectances of the inner mirror 40, the right outer mirror 44, and the left outer mirror 48 at the minimum reflectance.

In this embodiment, since the mirror control unit 58 switches the mirrors to the automatic antiglare state at the time which is a predetermined time prior to the time at which the driving mode is switched to the first driving mode in which an occupant performs a driving operation, the occupant can visually recognize a rearward situation before the occupant performs the driving operation.

In this embodiment, even when the inner mirror 40, the right outer mirror 44, and the left outer mirror 48 are in the antiglare keeping state, an occupant on a front seat can ascertain a rearward situation including rear seats by causing the temporary release unit 60 to temporarily switch the mirrors to the automatic antiglare state.

While the vehicular mirror system 10 according to the embodiment has been described above, the embodiment can be modified in various forms without departing from the gist of the disclosure. For example, a mirror control process illustrated in FIG. 5 may be performed.

Modified Examples

Figure 5:
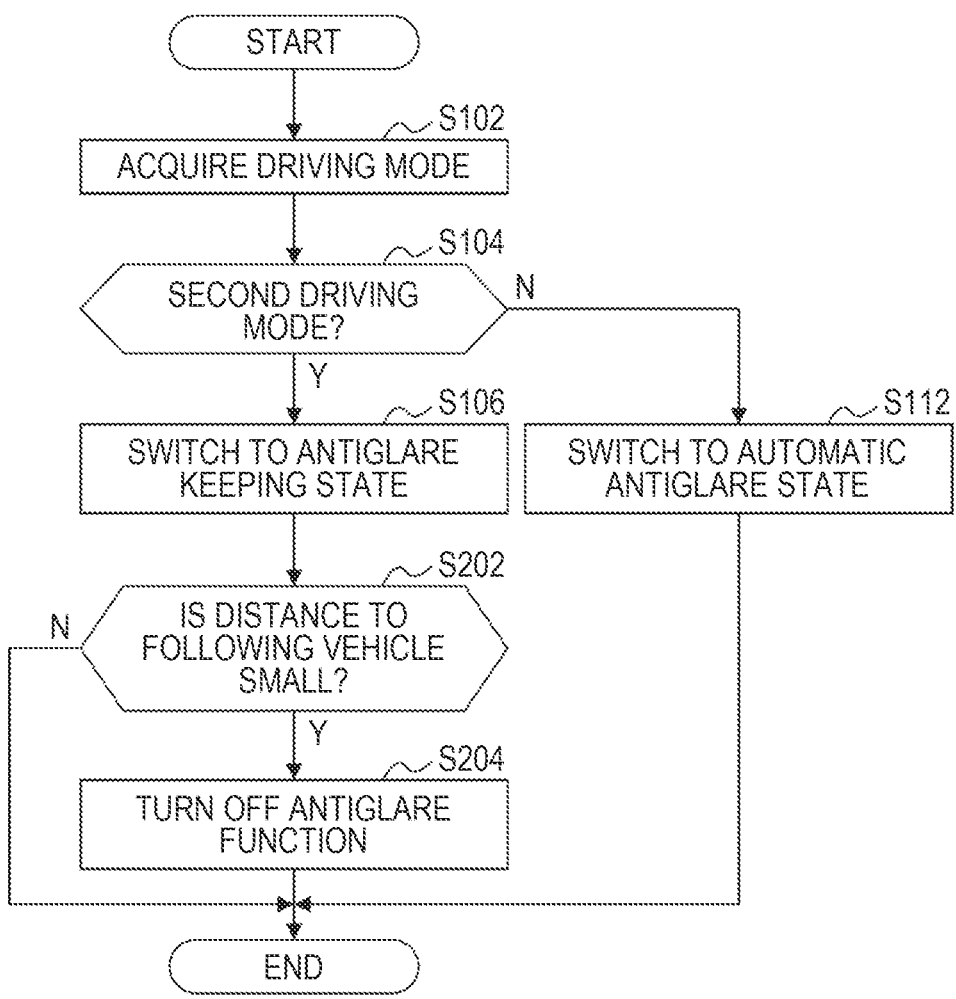
FIG. 5 is a flowchart illustrating another example of the flow of the mirror control process according to the embodiment.

FIG. 5 is a flowchart illustrating another example of a flow of a mirror control process of the vehicular mirror system 10. This mirror control process is performed by causing the CPU 14 of the mirror ECU 12 to read a program from the ROM 16 or the storage 20, to load the program to the RAM 18, and to execute the program. This mirror control process is performed at predetermined intervals until driving of the vehicle is ended after it has been started.

As illustrated in FIG. 5, Steps S102, S104, and S106 are the same as in the first embodiment. Then, the CPU 14 determines whether a distance to a following vehicle is small in Step S202. Specifically, the CPU 14 acquires a distance between the host vehicle and the following vehicle based on information of vehicle surroundings detected by the sensor group 32 using the automated driving ECU 30. Then, when the distance between the host vehicle and the following vehicle is less than a predetermined distance, the determination result of Step S202 is positive and the CPU 14 performs the process of Step S204. On the other hand, when the distance between the host vehicle and the following vehicle is greater than the predetermined distance, the CPU 14 ends the mirror control process.

The CPU 14 turns off an antiglare function in Step S204. At this time, both the first indicator 40A and the second indicator 40B illustrated in FIG. 2 are turned off. Then, the CPU 14 ends the mirror control process.

In the mirror control process according to the modified example, since the antiglare function is turned off when a following vehicle approaches the host vehicle, light from headlights of the following vehicle is reflected by the inner mirror 40, the right outer mirror 44, and the left outer mirror 48 and an occupant experiences glare. Accordingly, the occupant can intuitively ascertain approach of the following vehicle. That is, in comparison with a case in which notification is performed using only sound such as an alarm, it is possible to intuitively notify an occupant of a likelihood of rear end collision.

In the aforementioned embodiment, in the antiglare keeping state, the reflectances of the inner mirror 40, the right outer mirror 44, and the left outer mirror 48 are kept at the minimum reflectance, but the disclosure is not limited thereto. For example, in the antiglare keeping state, only the reflectance of the inner mirror 40 may be kept at the minimum reflectance.

In the antiglare keeping state, the reflectances of the inner mirror 40, the right outer mirror 44, and the left outer mirror 48 may be kept at a reflectance higher than the minimum reflectance. That is, in the antiglare keeping state, the reflectances of the inner mirror 40, the right outer mirror 44, and the left outer mirror 48 have only to be kept at low reflectances at which an occupant does not experience glare, and may be kept at an intermediate reflectance between the normal reflectance and the minimum reflectance.

The processes which are performed by causing the CPU 14 to read and execute software (a program) in the aforementioned embodiment may be performed by various processors other than the CPU 14. As the processor in this case, dedicated electric circuitry which is a processor having a circuit configuration which is dedicatedly designed to perform a specific process such as a programmable logic device (PLD) of which a circuit configuration can be modified after being manufactured such as a field-programmable gate array (FPGA) and an application-specific integrated circuit (ASIC) can be exemplified. The mirror control process may be performed by one of various processors or may be performed in combination of two or more processors of the same type or different types (for example, a plurality of FPGAs and a combination of a CPU and an FPGA). The hardware structure of such processors is specifically electric circuitry in which circuit elements such as semiconductor elements are combined.

In the aforementioned embodiment, the storage 20 is a memory which is a non-transitory recording medium, but the disclosure is not limited thereto. For example, a non-transitory recording medium such as a compact disk (CD), a digital versatile disk (DVD), or a universal serial bus (USB) may be used as a storage unit. In this case, various programs may be stored in such recording mediums.

What is claimed is:

1. A vehicular mirror system comprising:
a driving mode acquiring unit configured to acquire one of a first driving mode in which a vehicle travels using an occupant's driving operation and a second driving mode in which the vehicle travels regardless of the occupant's driving operation as a driving mode; and
a mirror control unit configured to set an automatic antiglare state in which a reflectance of a vehicular mirror facing rearward changes according to a light intensity difference between a light intensity on a side in front of the vehicle and a light intensity on a side to the rear of the vehicle with respect to the vehicular mirror when the driving mode acquired by the driving mode acquiring unit is the first driving mode and to set an antiglare keeping state in which the reflectance of the vehicular mirror is kept in a state in which the reflectance is lower than that in a normal state in which the light intensity difference is in a predetermined range when the driving mode acquired by the driving mode acquiring unit is the second driving mode.

2. The vehicular mirror system according to claim 1, wherein the mirror control unit is configured to continuously change the reflectance of the vehicular mirror between a normal reflectance in which a degree of antiglare is low and a minimum reflectance in which the degree of antiglare is high in the automatic antiglare state, and
wherein the mirror control unit is configured to keep the reflectance of the vehicular mirror at the minimum reflectance in the antiglare keeping state.

3. The vehicular mirror system according to claim 1, wherein the mirror control unit switches the antiglare keeping state to the automatic antiglare state at a time which is a predetermined time prior to a time at which the driving mode is switched from the second driving mode to the first driving mode.

4. The vehicular mirror system according to claim 1, wherein the mirror control unit switches the antiglare keeping state to the automatic antiglare state at a place which is a predetermined distance before a place at which the driving mode is switched from the second driving mode to the first driving mode.

5. The vehicular mirror system according to claim 1, further comprising a temporary release unit configured to temporarily switch the antiglare keeping state to the automatic antiglare state according to the occupant's operation.

6. The vehicular mirror system according to claim 1, wherein the mirror control unit is configured to change a reflectance of a vehicular mirror including an inner mirror which is provided on a ceiling of a cabin front part as the vehicular mirror.

7. The vehicular mirror system according to claim 1, wherein the mirror control unit is configured to change a reflectance of a vehicular mirror including a pair of outer mirrors which is provided at both ends in a vehicle width direction as the vehicular mirror.

8. A vehicular mirror control method comprising:
acquiring one of a first driving mode in which a vehicle travels using an occupant's driving operation and a second driving mode in which the vehicle travels regardless of the occupant's driving operation as a driving mode;
setting an automatic antiglare state in which a reflectance of a vehicular mirror facing rearward changes according to a light intensity difference between a light intensity on a side in front of the vehicle and a light intensity on a side to the rear of the vehicle with respect to the vehicular mirror when the acquired driving mode is the first driving mode; and
setting an antiglare keeping state in which the reflectance of the vehicular mirror is kept in a state in which the reflectance is lower than that in a normal state in which the light intensity difference is in a predetermined range when the acquired driving mode is the second driving mode.

\* \* \* \* \*

UNITED STATES PATENT AND TRADEMARK OFFICE
CERTIFICATE OF CORRECTION

| | | |
|---|---|---|
| PATENT NO. | : 11,560,093 B2 | Page 1 of 1 |
| APPLICATION NO. | : 17/319576 | |
| DATED | : January 24, 2023 | |
| INVENTOR(S) | : Tatsuya Shimizu | |

It is certified that error appears in the above-identified patent and that said Letters Patent is hereby corrected as shown below:

On the Title Page

After (65) Prior Publication Data US 2022/0055539 Al Feb. 24, 2022, Please insert:
--(30) Foreign Application Priority Data August 21, 2020 (JP) ......... JP2020-140432--

Signed and Sealed this
Seventh Day of November, 2023

Katherine Kelly Vidal
*Director of the United States Patent and Trademark Office*